United States Patent [19]
Saliba

[11] Patent Number: 5,671,389
[45] Date of Patent: Sep. 23, 1997

[54] ADAPTIVE COMPRESSION CACHING FOR TAPE RECORDING

[75] Inventor: George A. Saliba, Northboro, Mass.

[73] Assignee: Quantum Corporation, Milpitas, Calif.

[21] Appl. No.: 584,598

[22] Filed: Jan. 11, 1996

[51] Int. Cl.$^6$ .................................................. G06F 13/16
[52] U.S. Cl. ........................... 395/438; 395/465; 395/888; 395/250
[58] Field of Search ........................ 395/438, 888, 395/465, 250; 382/232; 360/48

[56] References Cited

U.S. PATENT DOCUMENTS

| | | | |
|---|---|---|---|
| 4,974,189 | 11/1990 | Russon et al. | 395/438 |
| 5,194,995 | 3/1993 | Severtson et al. | 360/48 |
| 5,210,829 | 5/1993 | Bitner | 395/250 |
| 5,210,851 | 5/1993 | Kato et al. | 360/48 |
| 5,357,614 | 10/1994 | Pattisam et al. | 395/250 |
| 5,568,650 | 10/1996 | Mori | 395/438 |

*Primary Examiner*—Eddie P. Chan
*Assistant Examiner*—Reginald G. Bragdon
*Attorney, Agent, or Firm*—David B. Harrison

[57] ABSTRACT

A method selectively compresses data entering a data storage device, such as a digital linear tape drive, based upon whether a data level of a device cache buffer is above a predetermined watermark reference level. If the data level is above the predetermined reference, a data record entering the storage device bypasses a data compressor on its way to storage. After each record is transferred the buffer level is redetermined. When the buffer level falls below the watermark, the data compressor is reenabled and a subsequent data record is compressed before being stored.

28 Claims, 5 Drawing Sheets

ADAPTIVE COMPRESSION CACHING FOR TAPE RECORDING

FIELD OF THE INVENTION

The present invention relates to a tape drive with a data compressor and a buffer which temporarily stores records in transit between the drive and a host computer. More particularly, the present invention relates to a method for adaptively compressing incoming data records to optimize host-tape drive data transfer rates.

REFERENCE TO RELATED PATENT

This patent is related to commonly assigned U.S. Pat. No. 5,210,829 to Bitner, entitled: "Adjustable Threshold for Buffer Management", the disclosure thereof being incorporated herein by reference.

BACKGROUND OF THE INVENTION

Tape drives are one category of mass storage peripheral devices within computing systems. Tape drives perform a number of important functions relating to the storage and retrieval of data. A primary function of tape storage is archival and back up of other storage resources, such as hard disk drives. Another function is data transfer, e.g. via a removable tape cartridge, from one computing system or environment to another system or environment. A third function is related to batch processing of a large number of physically sequential data files, during which random access to data is not required. A fourth function is to provide a vast amount of information on-line, as in library systems. In this latter functional activity, tape drives may be operated in conjunction with tape cartridge loaders to increase the amount of recorded information that may be accessed directly by a connected central processing unit (CPU) or other user.

Large tape drive systems having virtually instantaneous start-stop capability are known in the art. More recently, however, smaller linear tape drives, known as "streaming" tape drives, digital linear tape drives (DLT™), and helical scan tape drives, known as "digital audio tape" or "DAT" have become prevalent within many computing environments. These smaller drives are not adapted to instantaneous start and stop operations. Accordingly, user data sent to or retrieved from these smaller tape drives is usually formatted or packaged into multiple blocks or records by a host computing system to which the drive is connected.

When a block is to be written, the tape drive will gradually ramp tape velocity up to a nominal write speed, write one or more blocks or records to tape, and then ramp tape velocity down to zero. In order to pre-position the tape for the next write operation, and in order to maximize usage of available recording space on the tape, after the mechanism stops tape movement, it rewinds the tape some distance over the immediately written area, in order to provide a velocity ramp-up space before the next available tape area is reached during the next write operation. Through appropriate synchronization, by the time the tape drive reaches the blank portion of the tape onto which the new block is to be written, the tape will have reached its nominal write velocity, and the new data writing operation can safely be commenced, with a minimum gap separating the sequential record storage areas.

It is desirable to minimize the amount of start-stop activity of tape drives, in order to preserve tape life, minimize head wear, and reduce power consumption. One solution already known in the prior art is to provide an electronic cache buffer memory within the tape drive. One practical limitation on buffer size is the relatively high cost of semiconductor memory in comparison with tape media, etc. With a usefully large cache buffer capable of holding at least several compressed user data records, such records can be accumulated and then "streamed" to the tape in a single transaction, thereby reducing the number of start, stop operations of the tape drive mechanism. The above-referenced U.S. Pat. No. 5,210,829 describes a method for adjusting a watermark in a tape drive buffer in order to minimize host-tape data transfer stalls, and to maximize data transfer burst lengths to minimize tape start-stop operations.

Separately, it is known to compress data records prior to storage onto tape. One example of a DAT drive employing selective data compression is given by Severtson et al. U.S. Pat. No. 5,194,995, entitled: "Method and Apparatus for Recording Compressed Data on DAT Media", the disclosure thereof being incorporated herein by reference. This prior approach applies an algorithm to determine whether the data compression meets a predetermined standard of efficiency. If compression does not meet the efficiency standard, the data is recorded in uncompressed format. The approach described by Severtson et al. assumed that the data compressor operated at rates substantially above the effective data transfer rate between the host computer and the DAT device.

Data compressors typically apply a pattern recognition algorithm for identifying repeated patterns within a string of user data. Short code words are substituted for the detected patterns in a known way. The farther the compressor looks back at the data stream, the more efficient the data compression process becomes, but extended look backs require faster and faster compressors. Theoretically, if the data compressor can operate at a very high speed relative to data transfer speed, it is practical to approach the full transfer rate of the data storage device. However, practical data compressors cannot operate at infinitely high speeds. At high data record transfer rates between the host and the tape drive, practical and efficient data compression becomes very difficult. The speed of the data compressor is finite, and at high transfer rates, the data compressor may not be able to keep up with the host, particularly if it is based upon a look-up table compression algorithm. When the data transfer rate between the host and the tape drive exceeds the data compressor's maximum processing speed, the transfer is suspended, and the host becomes "stalled", until the data compressor can empty its queue of user data awaiting compression and thereby catch up with the record transfer.

One possible solution would be to connect a number of data compressors in parallel to process the incoming data. This parallel compression processing approach tends to be cumbersome and expensive. Also, since each of the parallel data compressors is not looking at the same string of user data as the others, the parallel data compression approach is not as efficient as a single data compression process.

One other possibility is to limit the transfer rate at which the data compressor will compress data to some maximum data rate. If transfer rate into the compressor is limited to e.g. five megabytes per second (MBS) and the compressor achieves a two to one compression ratio, the exiting data rate will be two and one half MBS, which may be considerably lower than the transfer rate to tape of the tape drive. If a three to one compression ratio is realized with an incoming data rate limited to five MBS, the transfer rate to tape will be 1.67 MBS, which may be considerably below the tape transfer rate. A typical data compression ratio is two or 2.5, and it is not unusual to achieve a data compression ratio of three or four to one with frequently encountered patterns within user data records.

Similarly, if the data record is coming into the tape drive at five MBS, for example, and the data compressor compresses the data at a compression ratio of two or three to one, the tape transport will receive compressed data effectively at one-half or one-third of the maximum data rate, forcing the tape mechanism to operate in an undesired start-stop mode, rather than in a continuous burst streaming operation.

Accordingly, a hitherto unsolved need has remained for a tape drive employing data compression which achieves a more optimized data record transfer rate between a host and the tape without host stall, and which achieves more continuous burst streaming operations to tape with fewer tape drive start-stop interruptions than heretofore.

SUMMARY OF THE INVENTION WITH OBJECTS

A general object of the present invention is to improve data transfer efficiency between a host and a storage device, such as a digital linear tape drive, within a computing system.

Another object of the present invention is to provide a more efficient tape storage system employing a data compressor in which host to tape drive data transfer rate approaches or even exceeds effective data transfer rate of the data compressor.

In accordance with principles of the present invention, a tape drive is connected to a host computer for storing and reading back user data records. The tape drive includes a tape for recording the user data records. The tape is mechanically moved whenever at least one user data record is being written thereto and whenever at least one user data record is being read back therefrom. An electronic interface connects the tape drive to the host computer via a suitable interface path structure. An electromechanical tape transport mechanism is provided for transporting the tape past a read/write head structure, preferably, although not necessarily in a streaming tape mode of operation. A data compressor in a path between the interface and the tape selectively compresses and decompresses the user data records during writing and readback operations, respectively. An electronic cache buffer is also located in the path between the interface and the tape, and provides temporary storage for temporarily storing the user data records. An electronic control circuit is responsive to data record level of the cache buffer and selectively enables and disables said data compressor, e.g. by activating a data bypass path, in order to maintain a desired data record level in the cache buffer, so as to optimize at least one of host computer to tape drive transfer rate, and time between starting and stopping of tape streaming operations of the tape transport mechanism.

In accordance with an aspect of the present invention, a method is provided for selectively compressing data entering a data storage device, such as a digital linear tape drive, the device including a data compressor, a bypass path selectively enabled around the data compressor, a cache buffer, and a storage medium, such as magnetic storage tape, connected to receive data in a streaming transaction from the cache buffer. The method comprises the steps of:

receiving a plurality of data records of predetermined size from a host computer connected to the device, compressing one of the plurality of data records by passing the record through the data compressor and then into the cache buffer, determining if a data level of the cache buffer following receipt of the one data record is above a predetermined watermark reference, and if so, enabling the bypass path around the data compressor, transferring an uncompressed second data record around the data compressor and into the cache buffer, redetermining data level of the cache buffer following transfer of the second data record, and selectively disabling or continuing the bypass path depending upon redetermined data level of the cache buffer.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

Figure 1:
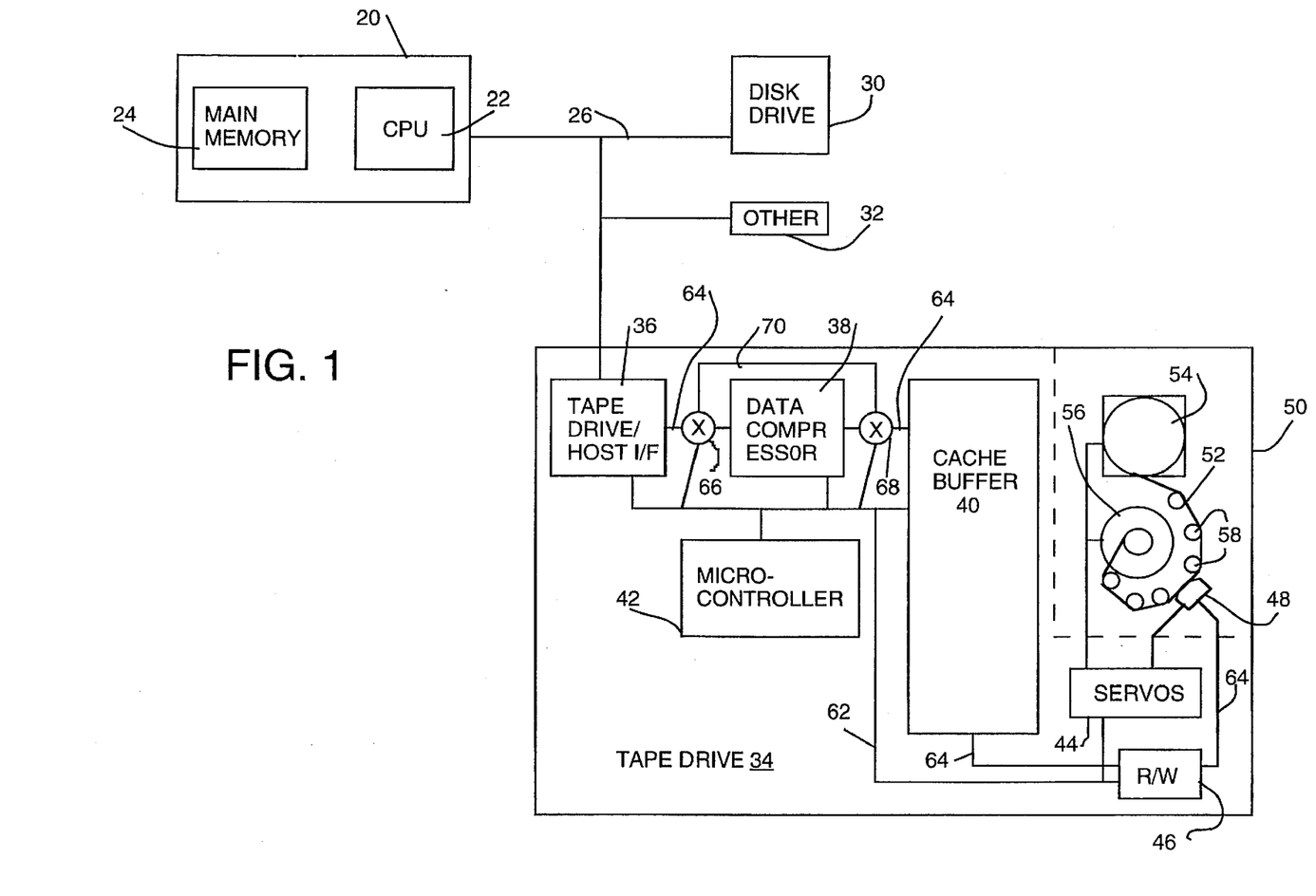
FIG. 1 is a simplified block diagram of a tape drive in accordance with principles of the present invention operatively connected within a host computing environment.

FIG. 1 represents an exemplary computing environment for explaining principles of the present invention. In this example, a host computer 20 including at least a central processing unit (CPU) 22 and a main memory 24, communicates with peripheral computing equipment via an interface bus structure 26, which may be a broad-band parallel or serial bi-directional path, or other suitable interconnection. Peripherals may include a hard disk drive 30, other devices 32, such as printers, terminals, etc., and a tape drive 34.

The tape drive 34 includes a tape drive/host interface circuit 36 for connecting the tape drive 34 to the bus structure 26. The tape drive 34 also includes a data compressor circuit 38 operating in accordance with a conventional data compression and compaction algorithm, such as Lempel-Zev, type 1 (LZ1). The tape drive 34 includes a suitably sized cache buffer memory 40, which in this example may be a four megabyte solid state random access memory array including an array controller (not separately shown). The tape drive 34 includes a programmed microcontroller 42 for controlling the various circuit elements and processes as more fully explained hereinafter. The tape drive 34 also includes motor speed, tape tensioning, and head positioning servo circuitry 44, and a data read/write electronics channel 46 leading to a head structure 48 within a tape transport mechanism 50 (which is shown in FIG. 1 to be separated by dashed lines from the rest of the electronics circuitry of the tape drive 34).

Magnetic recording tape 52, supplied from e.g. a single feed reel cartridge 54, is spooled onto an internal take up reel 56 after having passed sinuously around a plurality of tape guide rollers 58 and past the head structure 48. In this example an automatic tape buckling mechanism, not shown and not particularly pertinent to an understanding of the present invention, enables coupling of the tape from the cartridge 54 to a leader attached to the take up reel 56.

The tape drive/host interface 36 is connected to the head structure 48 via an internal data path 64 which includes the data compressor 38, the cache buffer 40 and the read/write circuitry 46. In accordance with aspects of the present invention, two control nodes 66 and 68 span the data compressor 38 within the data path 64 and are interconnected by a bypass path 70, the function of which will be explained in greater detail hereinafter.

The microcontroller 42 is connected to an internal control bus structure 62 which enables the microcontroller 42 to monitor and control the tape drive/host interface circuit 36, the data compressor 38, the cache buffer 40, the servos circuitry 44, and the read/write channel electronics 46. The microcontroller 42 also controls the two control nodes 66 and 68 spanning the data compressor 38. It will therefore be appreciated that a user data record incoming from the host computer 20 (or disk drive 30) may be passed directly into the data compressor 38 and then into the cache buffer 40 in compressed format, or the data record may be passed directly into the cache buffer 40 without being compressed, in accordance with the states of the control nodes 66 and 68 spanning the data compressor 38 within the internal data path 64. Also, it should be appreciated that some process latency exists within the data compressor 38, so that some time elapses from the time an unencoded user data record enters the compressor 38 until compressed data derived from the user data record completes exiting out of the compressor.

The mechanism for controlling operation of the nodes 66 and 68 with the microcontroller 42 will now be explained. In the following discussion, the following terms are defined as constants or reference values:

"Cr" equals overall system compression ratio, and is more precisely defined below.

"Wm" equals a reference water mark setting in the cache buffer 40; and, "Ws" equals a dynamic water mark level determined when compressed data has transferred into the cache buffer and before the data has transferred out of the cache buffer 40 to the tape 52. As used herein the term "reference water mark" means a level of user data present in the cache buffer which, when reached, causes the microcontroller 42 to direct the tape drive mechanism 50 to begin a tape winding, data transfer operation. In this sense it is given the same meaning as ascribed in U.S. Pat. No. 5,210,829 referenced above.

"A" equals an integer number of successive record transfer cycles which bypass the data compressor 38 in accordance with the method of the present invention. In a rapidly changing operating environment, where the host record data transfer rate is varying, A may be unity. In situations where the host data transfer rate is constant, A may be a suitable integral multiple of unity, such as four or five; A can also depend on type of user data and user data record size.

The following terms are defined herein as variables:

"M" equals the number of user data bytes passing into the data compressor 38.

"N" equals the number of user data bytes bypassing the data compressor 38 and reaching the cache buffer 40 in uncompressed format.

"N+M" equals the total number of data bytes received by the tape drive 34 from the host 20 during a given record transfer transaction.

"K" represents the compression ratio of data passing through the data compressor 38.

"R" equals user record block size. The record block size is established by the host computer 20, and is typically 10 kilobytes, 16 kilobytes or 32 kilobytes, for example. The record size is known to the microcontroller 42 and enables it to monitor transfer of complete records to and from the host 20.

"D" equals a number of user data bytes remaining as residue in the cache buffer 40 following completion of record transfer from the host.

Figure 2:
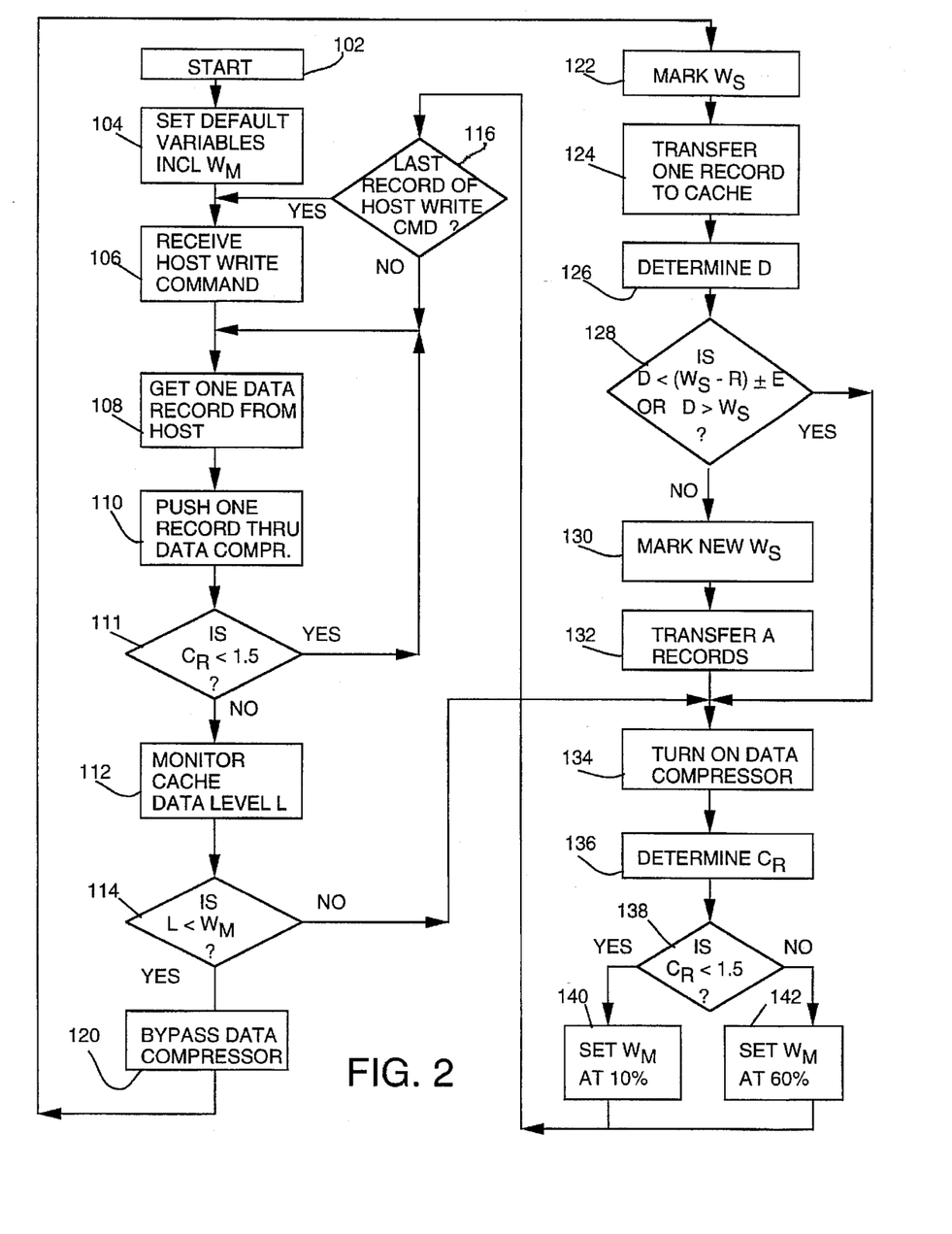
FIG. 2 is a flowchart of a first preferred method of operation of the tape drive shown in FIG. 1.

Referring now to FIG. 2 the microcontroller 42 enters an adaptive data compression/caching control routine at a start process step 102. Certain ones of the constants and variables defined above are set as initial values at a step 104. These default settings include an initial cache buffer reference watermark setting Wm, and an initial bypass records count A which denotes the number of data records to be sent into the cache buffer 40 without first being compressed by the data compressor 38. At the outset, default settings are selected to bias operation of the tape drive toward data compression and away from use of the bypass path 70. Thus, initial conditions are such that at least one data record, and probably a number of data records, will be compressed before being transferred into the cache buffer 40. As data transfer conditions, data compression conditions, and cache buffer levels vary, the tape drive 34 will dynamically adjust the default settings and invoke the bypass mode appropriately in order to maximize data transfer rate between the drive 34 and the host 20, and secondarily, to minimize the number of start-stop operations of the digital linear tape mechanism 50.

The tape drive 34 monitors the interface 26, and when a host write command is issued, it is received and decoded at a step 106. This command may include information such as record size and number of records to be transferred. When the host computer 20 signals transfer of one data record to the tape drive 34, it is transferred through the data compressor 38 under program control at a process step 110.

When the first data record has been compressed and transferred as M/K bytes into the cache, a logical step 111 is reached to determine whether the compression ratio Cr is less than 1.5. Since a default value of 1.5 or greater was set at step 104, the first pass answer is "no" and flow proceeds to a process step 112. If it is determined dynamically at a subsequent logical step 138 that the compression ratio Cr is less than e.g. 1.5, then the data flow process is close to optimal with data compression enabled, and there is no need to bypass the data compressor. In this case, the answer at 111 is "yes", and a return is made to step 108 so that the next data record will flow through the data compressor 38. However, if the compression ratio Cr is equal to or greater than e.g. 1.5 as measured at logical step 138, this fact is recorded, and when tested at logical node 111, control program flow reaches process step 112.

When process step 112 is reached, a determination is made of a cache data level L. A logical step 114 then determines if the cache data level has risen above the default watermark Wm. If not, the cache to tape data transfer rate is keeping up with incoming compressed data rate, and the data compressor 38 remains enabled. A logical step 116 is reached which determines if the record in the cache is the last record of the present host write command. If it is, a return is made to above the step 106, and the tape drive waits for a next host write command to be received. However, if the compressed record in the cache is not the last record, a return is made to above the step 108, and a next record is obtained from the host and passed through the steps 110, 112 and 114.

If at some point during a records transfer transaction the cache level L is determined to have risen above the default watermark reference value Wm at the logical step 114, a process step 120 is reached which activates the control nodes 66 and 68 to enable data compressor bypass. A process step 122 then marks the dynamic watermark level Ws, which represents the level of the cache buffer 40 after the last compressed data record has been received. A process step 124 then monitors transfer of one uncompressed data record from the host 20 into the cache buffer 40 via the bypass path 70. A process step then determines the residue cache level D as the number of user data bytes remaining to be transferred to tape at the completion of transfer of the uncompressed data record. A logical step 128 is then reached which tests for two separate conditions. The first condition is whether the new residue value D is less than (or equal to) a difference between the dynamic watermark level Ws marked at the step 122 minus the uncompressed record size R (plus or minus a tolerance value Epsilon, which in this example may be 10% of the uncompressed record size, for example). The second condition tested by the logical node 128 is whether the new residue value D is greater than the dynamic watermark level Ws marked at step 122.

The first condition (D≤(Ws−R)±ε) is an indication that the data level in the cache is dropping dramatically. This situation may be obtained if the host 20 is transferring data to the tape drive in an intermittent or sporadic fashion. If so, the tape drive 34 will be placed into a start-stop mode, and the data compression will be enabled. The cache buffer will fill with compressed data records before being streamed out to tape, and the number of tape stop-start operations will be minimized by virtue of data compression.

The second condition (D>Ws) is that the cache buffer 40 is rapidly filling up with untransferred data awaiting streaming to tape. This second condition is an indication that the incoming user data is being compressed so efficiently that when data compression is bypassed via the path 70, the data transfer rate to the tape is being exceeded by the incoming uncompressed data transfer rate, and that it is necessary to resume data compression at once, and a process step 134 is reached directly from the logical step 128 which turns on the data compressor 38 by disabling the bypass path 70 at control nodes 66 and 68.

If neither the first or second condition is true, then D is greater than the difference between Ws and the record size R, and is less than the dynamic watermark level Ws, and it is appropriate to continue to bypass data compression for additional records. Accordingly, a process step 130 marks a new dynamic watermark level Ws which reflects the level of data in the cache buffer at the end of the transfer of the first uncompressed record over the bypass path 70. A process step 132 then transfers a number of records corresponding to the value A, such as between one and four data records; and, process step 134 is reached at which the data compressor 38 is enabled.

An updated overall data compression ratio Cr is then determined at a process step 136 in accordance with the relation:

$$C_r = \frac{N + \frac{M}{K}}{N + M},$$ (Equation 1)

wherein N equals the number of bytes of uncompressed user data records entering the cache, M/K equals the number of bytes of compressed data entering the cache, and N+M equals the number of bytes of uncompressed user data received from the host during the current data transfer transaction. The microcontroller 42 e.g. monitors the bytes flowing from the host 20 (N+M) and from the data compressor 38 (M/K) in order to calculate equation 1 at process step 136.

A logical step 138 then determines if the overall compression ratio Cr as determined at the step 136 is less than or equal to a predetermined reference compression level, e.g. 1.5. If the overall compression ratio Cr is less than or equal to 1.5, a process step 140 sets the cache buffer reference watermark Wm relatively low, as at 10% of total temporary storage capacity. This low setting means that the data compressor 38 is very rarely, if ever, bypassed. The cache 40 has to empty almost to the bottom, i.e. below the 10% low reference watermark Wm before the bypass mode is enabled. However, if the compression ratio Cr is greater than 1.5, a process step 142 is reached which sets the cache buffer reference watermark Wm high, as at 60% of total temporary storage capacity. This higher reference watermark Wm is appropriate when data compression efficiency results in large relative swings in the cache buffer data level, and the bypass mode offers the possibility of continuing data streaming tape operations without interruption. Logical step 116 is then reached and determines whether the latest record to enter the cache buffer 40 is the last record to be transferred during the current command from the host.

As already explained, data transfers from the cache buffer 40 to tape 52 occur during tape streaming operations. Until the data level L in the cache buffer 40 first rises to a predetermined tape transfer watermark, the tape 52 is stopped. Once the tape transfer watermark (which is separate from the compression reference watermark Wm and the dynamic watermark level Ws) is passed, the tape drive 50 accelerates the tape 52 to writing speed, and data in the cache 40 is then streamed onto the tape at a predetermined transfer rate, such as 5 MBS, until the cache is emptied. Depending upon host transfer rate and the frequency of record transfers, as well as adaptive data compression in accordance with principles of the present invention, the tape drive 50 may operate substantially constantly, or it may operate in start-stop mode, with an efficiently minimized number of start-stop operations. A preferred method for managing transfers of data from the cache 40 to tape 52 is described in U.S. Pat. No. 5,210,829 referenced above.

Figure 3:
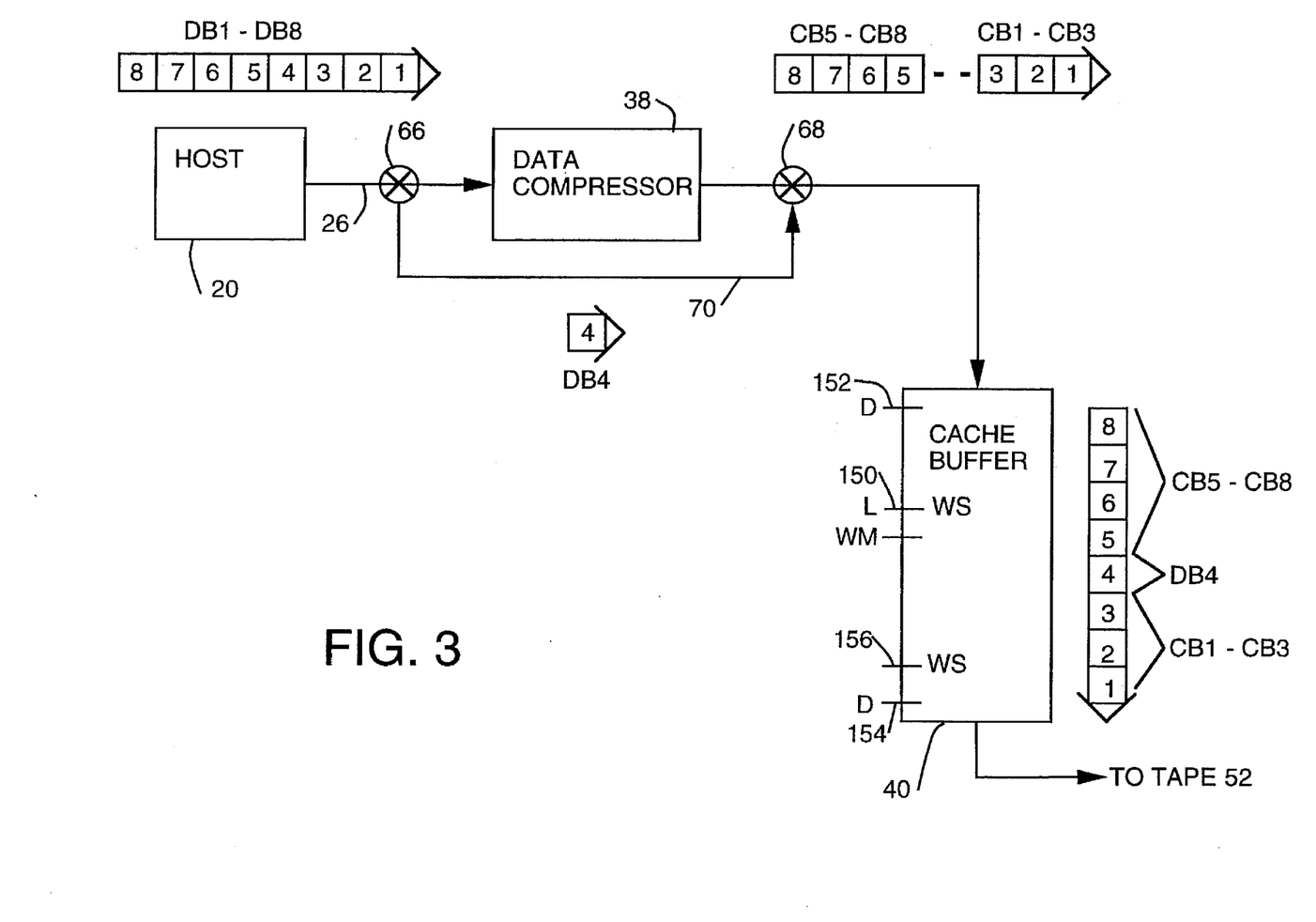
FIG. 3 is a first example illustrating preferred methods of operation of the tape drive shown in FIG. 1.

Several examples are now presented to illustrate several control situations. Turning to FIG. 3, a host transfer command received at step 106 calls for transfer to tape of a sequence of user data records DB1–DB8. A first one of these records, DB1, is obtained from the host at step 108 and pushed through the data compressor 38 at step 110. Upon compression into M/K bytes by the data compressor 38, the compressed data record CB1 is transferred into the cache buffer 40. Since this is the first record of the transfer, the cache level L is well below the initial watermark reference level Wm, and additional data blocks continue to be received into, and compressed by, the data compressor 38.

When the third data record DB3 is received at the tape drive 34 and compressed by the data compressor, the cache data level L exceeds the initially set reference watermark Wm, and the bypass process steps 120, 122, 124, 126 and 128 are followed for the next data record DB4 (which bypasses the data compressor 38 and enters the cache buffer 40 in an uncompressed data format). At step 128 a decision is made as to whether to continue in the bypass mode, or to resume data compression. In one scenario of the FIG. 3 example, the residue level D (reference 152) is above the Ws mark (reference 150), meaning that discontinuance of compression has caused the untransferred data level L in the cache 40 to rise rapidly upon receipt of the uncompressed data block DB4 (assuming tape streaming operations are continuing at a maximum streaming rate). In this situation, the logical step 128 determines that only one record DB4 is to bypass the data compressor 38, and the three subsequent records DB5–DB8 are subjected to compression and become compressed records CB5–CB8.

It should be noted that after each record is transferred to the cache 40, a revised determination of compression ratio Cr is made by steps 136 and 138, with possible adjustments in the reference watermark level Wm at steps 140 or 142.

In another scenario presented by the FIG. 3 example, after data record DB4 has bypassed the data compressor 38, process step 128 determines that the data residue level D (reference 154) is less than the dynamic level Ws (reference 156) minus the uncompressed record size R, a significant drop in cache level is detected, and data compression is also reenabled, since it is most likely that the tape mechanism 50 will be forced into a start-stop mode for succeeding records DB6–8, etc. Compression mode is invoked at logical step 128 in this latter scenario in order to maximize the intervals between stop and start operations of the tape mechanism 50 to minimize tape and head wear.

Figure 4:
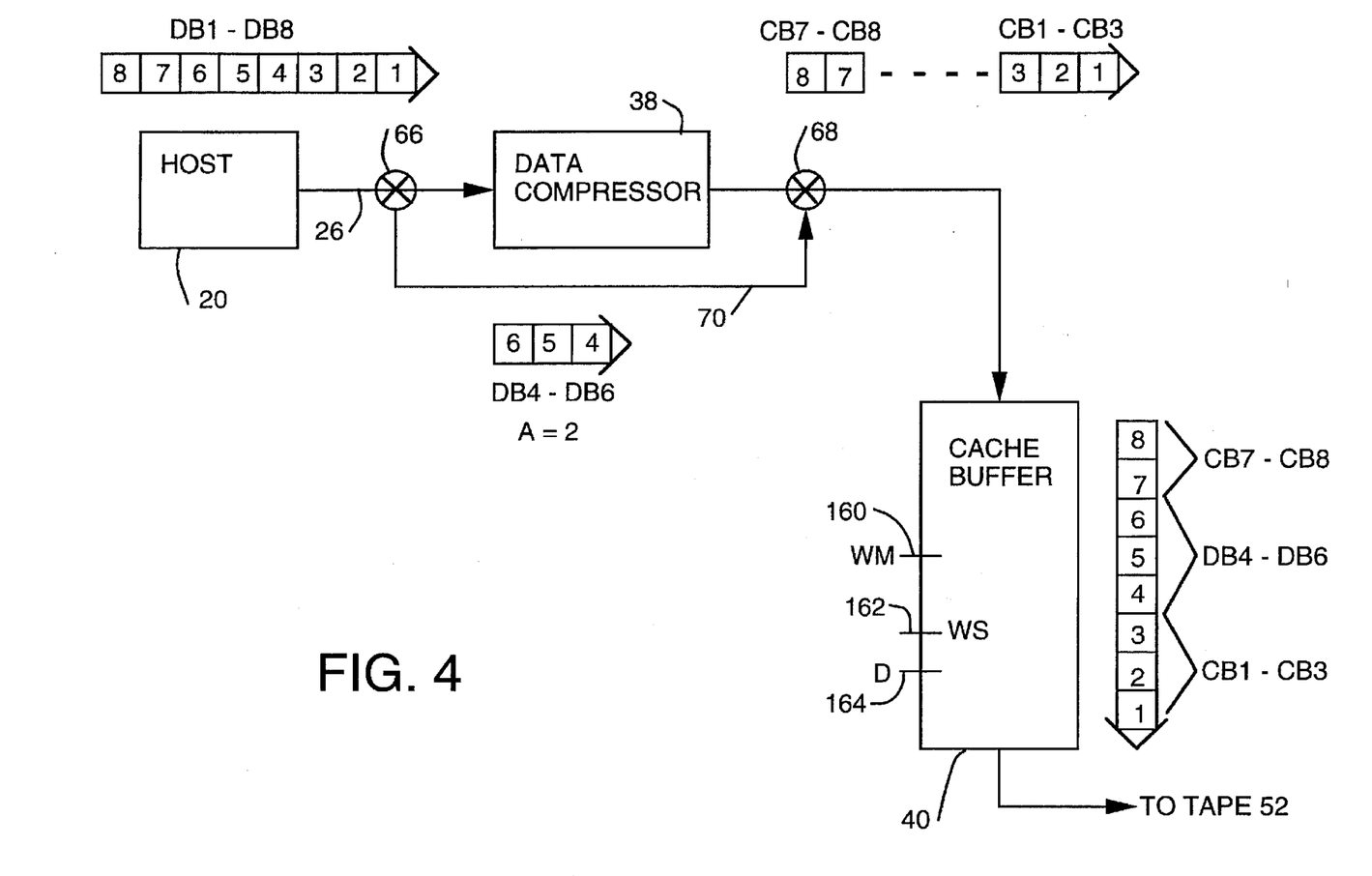
FIG. 4 is a second example illustrating another preferred method of operation of the tape drive shown in FIG. 1.

In the example of FIG. 4 eight data blocks DB1–DB8 are being transferred from the host at a 7.5 MBS rate. As in the FIG. 3 example, the first three blocks DB1–DB3 pass through the data compressor 38 and compressed data blocks CB1–CB3 pass into the cache buffer 40 before the level L exceeds the watermark reference level Wm (reference 160). In this example, however, the dynamic watermark level Ws (reference 162) marked at step 122 during bypass of the first bypass block DB4 is lower than the reference watermark Wm, and the residue level D (reference 164) as determined at step 126 is below the dynamic watermark level Ws (reference 162). In this situation, neither of the conditions tested for at logical step 128 is true, and steps 130 and 132 are invoked by which a predetermined number (A) of data records are bypassed around the data compressor 38 before reaching the cache buffer 40. In the example illustrated in FIG. 4, the predetermined number A is 2, and therefore, blocks DB5 and DB6 also enter the cache buffer 40 before data compression is resumed for blocks DB7 and DB8.

As noted, each operational pass through the FIG. 2 flow diagram includes a redetermination of the overall data compression ratio Cr, taking into account the effect of transferring uncompressed data records into the cache buffer 40. If the overall compression ratio (equation 1) is relatively low, such as less than or equal to 1.5 to 1, the data compressor 38 is operating at nearly full transfer speed, and the reference watermark Wm is set very low, as at 10% of buffer capacity, so that the data compressor 38 is almost never bypassed. With a 10% setting for Wm, basically the cache 40 has to be virtually empty before the bypass path 70 is enabled. If the overall compression ratio (equation 1) is high, as above 1.5 to 1, greater dynamic shifts in cache storage level will occur during record transfer operations, and the higher reference watermark Wm at e.g. 60% is appropriate. In this case, many, but not all, of the user data records will pass through the data compressor 38.

Figure 5:
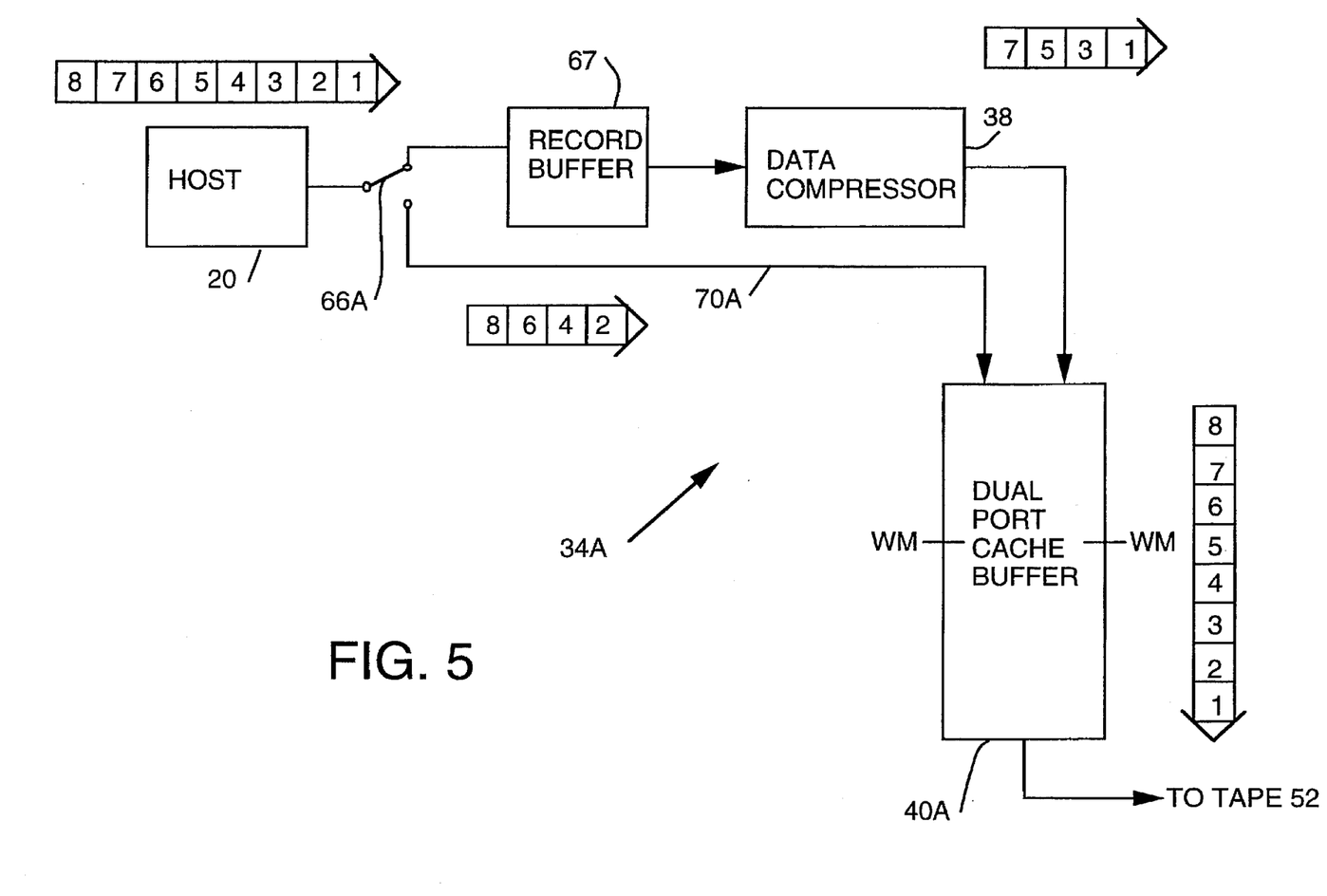
FIG. 5 is a third example illustrating a further preferred embodiment and method of operation of a tape drive incorporating principles of the present invention.

Turning now to FIG. 5, a tape drive 34A incorporates a slightly different structure and operating principle, within the context of the present invention. Therein, the host 20 is shown transferring e.g. 8 data records DB1–DB8. The path control 66A is essentially the same as 66, but leads to a record buffer 67 as well as to the bypass path 70A, which in this example enters a dual input port cache buffer 40A. The record buffer 67 supplies records to be compressed to the data compressor 38, which also directly feeds a second input port of the dual input port cache buffer 40A. It will be remembered and appreciated that the data compressor 38 imposes a processing time or latency in order to compress each data block. Depending upon processing latency of the data compressor 38, it is practical to bypass a data record, e.g. DB2 and interleave it on a byte-by-byte basis with compressed data bytes comprising data record DB1 which will be leaving the data compressor 38 and entering the buffer 40A at the same time that data record DB2 is entering the cache buffer 40A directly via the bypass path 70. A memory control process (not shown) suitably arranges dual pointers for the two simultaneously received data streams within the cache buffer 40A, and delivers concatenated records, e.g. CB1, DB2, CB3, DB4, CB5, DB6, CB7, DB8, for recording onto the tape 52. This arrangement thereby achieves a data transfer rate advantage over the previously described examples in time-compacting data records being supplied to the cache buffer 40. In this manner, e.g. every odd data block would be compressed while every even data block would follow the bypass path, and the two simultaneously present data streams at the dual port cache buffer 40A are recorded and sent to tape 52. A dual watermark scheme of the type described herein is maintained to control this operation. During readback, the process of is reversed, and the compressed data blocks are selectively decompressed by the compressor 38, while the uncompressed data blocks are delivered directly to the host.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A tape drive connected to a host computer for storing and reading back user data records, said tape drive comprising:

a tape for recording said user data records, said tape being mechanically moved whenever at least one user data record is being written to said tape and whenever at least one user data record is being read back from said tape, an electronic interface for connection to said host computer via an interface path structure, an electromechanical tape transport mechanism for transporting said tape past a read/write head structure, a data compressor in a path between said interface and said tape for selectively compressing and decompressing said user data records, an electronic cache buffer in the path between said interface and said tape for temporarily storing said user data records, and electronic control means responsive to a data record level of said cache buffer for selectively enabling and disabling said data compressor to maintain a desired data record level in said cache buffer in order to maximize a data transfer rate between said host computer and said tape.

2. The tape drive set forth in claim 1 wherein the electronic control means selectively enables and disables said data compressor on a data record by data record basis.

3. The tape drive set forth in claim 1 further comprising an incoming control point and a bypass path leading from the incoming control point to the electronic cache buffer, the electronic control means for controlling the control point to selectively pass records through the data compressor and through the bypass path.

4. The tape drive set forth in claim 3 further comprising a compressor control point between the data compressor and the electronic cache buffer and connected to the bypass path, the compressor control point being controlled by the electronic control means for selectively passing compressed records from the data compressor and uncompressed records on the bypass path to the electronic cache buffer.

5. The tape drive set forth in claim 3 wherein the electronic cache buffer is a dual input port cache buffer, one port being connected to the data compressor, another port being connected to the bypass path, and further comprising a record buffer between the incoming control point and the data compressor.

6. A tape drive connected to a host computer for storing and reading back user data records, said tape drive comprising:
   a tape for recording said user data records, said tape being mechanically moved whenever at least one user data record is being written to said tape and whenever at least one user data record is being read back from said tape,
   an electronic interface for connection to said host computer via an interface path structure,
   an electromechanical tape transport mechanism for transporting said tape past a read/write head structure,
   a data compressor in a path between said interface and said tape for selectively compressing and decompressing said user data records,
   an electronic cache buffer in the path between said interface and said tape for temporarily storing said user data records, and
   electronic control means responsive to a data record level of said cache buffer for selectively enabling and disabling said data compressor to maintain a desired data record level in said cache buffer in order to minimize a number of start and stop operations of the electromechanical tape transport mechanism.

7. The tape drive set forth in claim 6 wherein the electronic control means selectively enables and disables said data compressor on a data record by data record basis.

8. The tape drive set forth in claim 6 further comprising an incoming control point and a bypass path leading from the incoming control point to the electronic cache buffer, the electronic control means for controlling the control point to selectively pass records through the data compressor and through the bypass path.

9. The tape drive set forth in claim 8 further comprising a compressor control point between the data compressor and the electronic cache buffer and connected to the bypass path, the compressor control point being controlled by the electronic control means for selectively passing compressed records from the data compressor and uncompressed records on the bypass path to the electronic cache buffer.

10. The tape drive set forth in claim 8 wherein the electronic cache buffer is a dual input port cache buffer, one port being connected to the data compressor, another port being connected to the bypass path, and further comprising a record buffer between the incoming control point and the data compressor.

11. A method for selectively compressing data entering a data storage device, the device including a data compressor, a bypass path selectively enabled around the data compressor, a cache buffer, and a storage medium connected to receive data from the cache buffer, the method comprising the steps of:
   receiving a plurality of data records of predetermined size from a host computer connected to the data storage device,
   compressing at least one of the plurality of data records by passing the record through the data compressor and then into the cache buffer,
   determining if a data level of the cache buffer following receipt of the at least one of the plurality of data records is above a predetermined watermark reference, and if so, enabling the bypass path around the data compressor,
   transferring an uncompressed next one of the plurality of data records around the data compressor and into the cache buffer,
   redetermining the data level of the cache buffer following transfer of the uncompressed next one of the plurality of data records,
   selectively disabling the bypass path depending upon the redetermined data level of the cache buffer, and
   transferring the data in the cache buffer to the storage medium.

12. The method set forth in claim 11 comprising the further step of determining an overall data storage device compression ratio Cr based upon transfer of compressed data records and uncompressed data records into the cache buffer.

13. The method set forth in claim 12 wherein the method of determining the overall data storage device compression ratio Cr is in accordance with:

$$C_r = \frac{N + \frac{M}{K}}{N + M}$$

wherein:
   M equals the number of user data bytes passing into the data compressor,
   N equals the number of user data bytes bypassing the data compressor and reaching the cache buffer in uncompressed format,
   N+M equals the total number of data bytes received by the storage device from the host computer during a user data record transfer transaction, and
   K represents a compression ratio of data passing through the data compressor.

14. The method set forth in claim 12 comprising the further step of adjusting the predetermined watermark reference up or down in accordance with whether the overall data storage device compression ratio Cr is above or below a reference value.

15. The method set forth in claim 14 wherein the reference value is 1.5.

16. The method set forth in claim 11 wherein the step of redetermining the data level of the cache buffer following transfer of the uncompressed next one of the plurality of data records comprises the step of determining whether a residue data level D is greater than a dynamic watermark level Ws marked after transfer into the cache buffer of the one compressed data record.

17. The method set forth in claim 11 wherein the step of redetermining the data level of the cache buffer following transfer of the uncompressed next one of the plurality of data records comprises the step of determining whether a residue data level D is approximately less than a difference between a dynamic watermark level Ws marked after transfer into the cache buffer of the one compressed data record and an uncompressed record size R established by the host computer.

18. The method set forth in claim 17 wherein if the residue data level D is determined to be greater than the dynamic watermark level Ws, subsequent ones of the plurality of data records following the next one are also bypassed around the data compressor.

19. The method set forth in claim 18 wherein if the residue data level D is approximately less than the difference between the dynamic watermark level Ws and uncompressed record size R, subsequent ones of the plurality of data records following the next one are also bypassed around the data compressor.

20. The method set forth in claim 19 wherein the step of determining if the residue data level D is approximately less than the difference between the dynamic watermark level Ws and the uncompressed record size R includes adding to the determination a predetermined tolerance range, Epsilon.

21. The method set forth in claim 20 wherein the predetermined tolerance range, Epsilon, is equal to plus and minus ten percent of the uncompressed record size R.

22. The method set forth in claim 11 wherein the data storage device comprises a digital linear tape drive in which data in the cache buffer is streamed to tape in transfer bursts.

23. The method set forth in claim 11 comprising the further step of simultaneously transferring the compressed at least one of the plurality of data records and the uncompressed next one of the plurality prior to entry thereof into dual input ports of the cache buffer for transfer to the storage medium.

24. A tape drive connected to a host computer for storing and reading back user data records, said tape drive comprising:

a tape for recording said user data records, an electromechanical tape transport mechanism for transporting said tape past a read/write head structure, said tape being mechanically moved whenever at least one user data record is being written to said tape and whenever at least one user data record is being read back from said tape, an electronic interface for connection to said host computer via an interface path structure, an electronic cache buffer connected to a data path to and from the read/write head structure, for temporarily storing said user data records, the electronic cache buffer having a first input port and a second input port, a data compressor in a path between said interface and the first input port for selectively compressing and decompressing said user data records, an incoming control point in the path between said interface and said electronic cache buffer for selectively connecting a data compressor bypass path from the electronic interface to the second input port, a record buffer between the incoming control point and the data compressor, and electronic control means responsive to a data record level of said electronic cache buffer for controlling the incoming control point to selectively pass records through the record buffer and data compressor and through the bypass path around said record buffer and data compressor so as to maintain a desired data record level in said cache buffer.

25. The tape drive set forth in claim 24 wherein the electronic control means controls said incoming control point to maintain a desired data record level in said cache buffer in order to maximize a data transfer rate between said host computer and said tape.

26. The tape drive set forth in claim 24 wherein the electronic control means controls said incoming control point to maintain a desired data record level in said cache buffer in order to minimize a number of start and stop operations of the electromechanical tape transport mechanism.

27. A tape drive connected to a user data record source for storing and reading back user data records, said tape drive comprising:

a tape for recording said user data records sent by the user data record source, said tape being mechanically moved whenever at least one user data record is being written to said tape and whenever at least one user data record is being read back from said tape, an electronic interface for connection to said user data record source via an interface path structure for receiving a sequence of user data records to be recorded to said tape, an electromechanical tape transport mechanism for transporting said tape past a read/write head structure, a data compressor in a path between said interface and said tape for selectively compressing and decompressing ones of said user data records, an electronic cache buffer in the path between said interface and said tape for temporarily storing said user data records, and electronic control means responsive to a recurrent cache buffer level determination for selectively enabling and disabling said data compressor to maintain a data record level in said electronic cache buffer as will cause at least one of:

maximizing a transfer rate of the sequence of user data records from said user data record source to said tape, and minimizing a number of start and stop operations of the electromechanical tape transport mechanism during recording of the sequence of user data records.

28. The tape drive set forth in claim 27 wherein the electronic control means determines cache buffer level following transfer into the electronic cache buffer of each user data record of the sequence.

\* \* \* \* \*